United States Patent
Figueroa

(10) Patent No.: US 12,167,756 B2
(45) Date of Patent: Dec. 17, 2024

(54) UTILIZATION METHOD AND TAG WITH EMBEDDED RF-ENABLED CHIP

(71) Applicant: World Emblem International, Inc., Hollywood, FL (US)

(72) Inventor: Manuel Figueroa, Cooper City, FL (US)

(73) Assignee: World Emblem International, Inc., Hollywood, FL (US)

( * ) Notice: Subject to any disclaimer, the term of this patent is extended or adjusted under 35 U.S.C. 154(b) by 723 days.

(21) Appl. No.: 17/196,424

(22) Filed: Mar. 9, 2021

(65) Prior Publication Data
US 2022/0287386 A1    Sep. 15, 2022

(51) Int. Cl.
*A41D 1/00* (2018.01)
*H04B 5/72* (2024.01)
*H04B 5/77* (2024.01)

(52) U.S. Cl.
CPC .............. *A41D 1/002* (2013.01); *H04B 5/72* (2024.01); *H04B 5/77* (2024.01)

(58) Field of Classification Search
CPC ..... A41D 1/002; H04B 5/0031; H04B 5/0062
See application file for complete search history.

(56) References Cited

U.S. PATENT DOCUMENTS

| | | | |
|---|---|---|---|
| 7,652,579 | B2 | 1/2010 | Keyaki et al. |
| 9,330,558 | B2 * | 5/2016 | Logan ............... H04M 1/72412 |
| 9,767,323 | B2 | 9/2017 | Dolph et al. |
| 10,357,066 | B2 * | 7/2019 | Martin ..................... A43D 1/00 |
| 11,132,595 | B1 * | 9/2021 | Alberth, Jr. ...... G06K 19/07749 |
| 11,238,324 | B1 * | 2/2022 | Marquardt ......... G06K 19/0709 |
| 2001/0042262 | A1 | 11/2001 | Chu |
| 2003/0160732 | A1 * | 8/2003 | Van Heerden ... G06K 19/07749 |
| | | | 343/897 |
| 2010/0225485 | A1 * | 9/2010 | Appalucci ........... E05B 73/0017 |
| | | | 340/572.9 |

(Continued)

FOREIGN PATENT DOCUMENTS

GB     2553003 A     2/2018

*Primary Examiner* — Mohamed Barakat
*Assistant Examiner* — Rufus C Point
(74) *Attorney, Agent, or Firm* — Mark C. Johnson; Johnson | Dalal

(57) ABSTRACT

A method utilizing a tag with embedded RF-enabled chip that includes steps of providing an apparel body of a cloth material or a body of a non-apparel tangible item such as, without limitation, mug, bottle, box, hat, or any other widely available retail product, a RF tag layup with a first tag layer of a polymeric adhesive material directly coupled to the apparel body or body and a second tag layer directly coupled to the first tag layer to encapsulate and define a chip cavity with an electronic chip disposed therein and having a non-transitory memory storage operably configured to store digital data thereon and a data transmitter operably configured to wirelessly transfer the stored digital data through an electronic communication protocol and using radio waves, and a data reader operably configured to receive the digital data stored on the non-transitory memory storage of the electronic chip. Then, the process includes storing digital data and utilizing the data reader to receive the digital data from the non-transitory memory storage of the electronic chip.

16 Claims, 4 Drawing Sheets

(56) References Cited

U.S. PATENT DOCUMENTS

| | | | | |
|---|---|---|---|---|
| 2012/0132718 | A1* | 5/2012 | Manzi | G06K 19/07749 |
| | | | | 235/492 |
| 2013/0073375 | A1* | 3/2013 | Abhyanker | H04B 5/79 |
| | | | | 705/14.39 |
| 2014/0326791 | A1* | 11/2014 | Ishida | G06K 19/0723 |
| | | | | 29/25.01 |
| 2015/0145671 | A1 | 5/2015 | Cohen et al. | |
| 2016/0148086 | A1* | 5/2016 | Clarke | G06K 19/027 |
| | | | | 235/492 |
| 2016/0210548 | A1* | 7/2016 | Blair | G06K 19/07758 |
| 2016/0308583 | A1* | 10/2016 | Hsu | H04B 5/0025 |
| 2017/0092098 | A1* | 3/2017 | Alampallam | A41D 1/002 |
| 2018/0110266 | A1* | 4/2018 | Lee | A41D 1/005 |
| 2018/0115900 | A1* | 4/2018 | Defrance | H04B 5/0031 |
| 2018/0122273 | A1* | 5/2018 | Dixon | G09F 3/0297 |
| 2019/0057530 | A1* | 2/2019 | Yochum | G06T 11/60 |
| 2019/0109617 | A1* | 4/2019 | Omori | G06K 19/077 |
| 2019/0138766 | A1* | 5/2019 | Colby | G06Q 20/4012 |
| 2019/0371161 | A1* | 12/2019 | Brinkley | G08B 27/006 |
| 2020/0220576 | A1* | 7/2020 | Richter | H04B 5/0012 |
| 2020/0285821 | A1* | 9/2020 | Chandramowle | G06K 19/027 |
| 2020/0306577 | A1* | 10/2020 | Olander | A63B 21/0607 |
| 2021/0020012 | A1* | 1/2021 | Shakedd | G08B 13/2488 |
| 2021/0103938 | A1* | 4/2021 | Bulawski | H04W 12/47 |
| 2021/0158115 | A1* | 5/2021 | Chandramowle | H01Q 1/2225 |
| 2021/0166100 | A1* | 6/2021 | Bühler | G06K 19/027 |
| 2021/0241593 | A1* | 8/2021 | Allen | H04B 5/0062 |
| 2021/0271951 | A1* | 9/2021 | Moon | C09J 121/00 |
| 2022/0147787 | A1* | 5/2022 | Clauss | H01Q 1/225 |
| 2022/0185437 | A1* | 6/2022 | Myslinski | A61B 5/0015 |
| 2022/0309310 | A1* | 9/2022 | Demidov | G06K 19/07749 |

\* cited by examiner

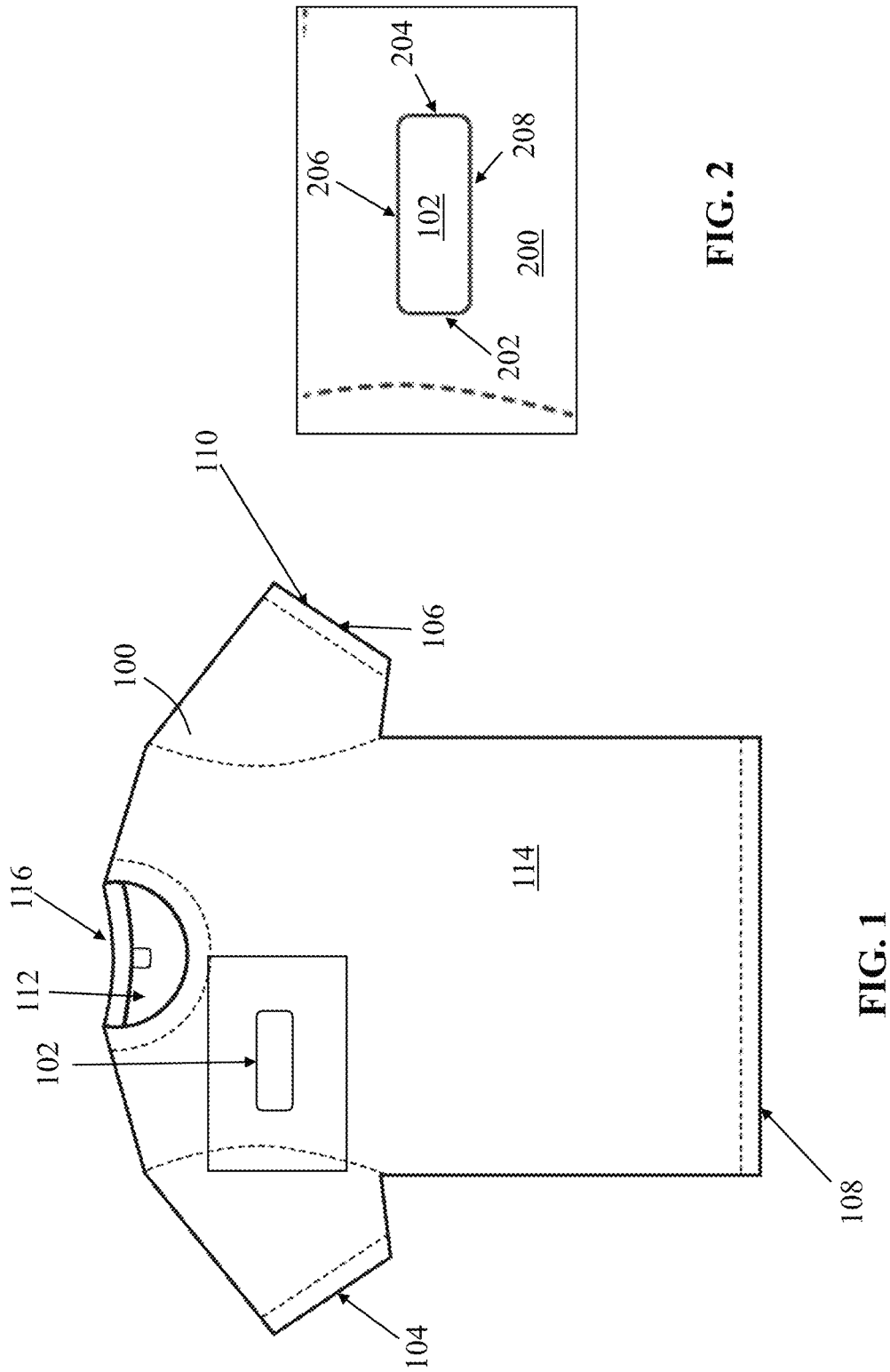

UTILIZATION METHOD AND TAG WITH EMBEDDED RF-ENABLED CHIP

FIELD OF THE INVENTION

The present invention relates generally to a utilization method and tag, and, more particularly, relates to a radio frequency (RF) enabled, e.g., near field communications (NFC), chip embedded within a RF tag layup which may be selectively affixed or adhered to a piece of apparel or other tangible product, e.g., mug, bottle, box, hat, etc.

BACKGROUND OF THE INVENTION

Many individuals purchase, acquire, and/or wear apparel items, namely shirts. Purchasing or acquiring the apparel item, many users analyze the composition of the shirt and other source-identifying content, e.g., who the manufacturer is, where the apparel was manufactured, etc. There are some known devices and methods of utilizing communication tags with apparel, but none are believed to permit one-way communication of data housed or supplied to the communication tags in a safe and effective manner that enables the apparel to be continually and conventionally utilized by the user in a conspicuous manner.

Therefore, a need exists to overcome the problems with the prior art as discussed above.

SUMMARY OF THE INVENTION

The invention provides a utilization method and tag with embedded RF-enabled chip therein that overcomes the hereinafore-mentioned disadvantages of the heretofore-known devices and methods of this general type and that effectively and efficiently enables users to receive information from the RF-chip for tracking and communication purposes. Additionally, the layup of the tag and chip enables the user to repeatedly wash and/or use the apparel items without damaging the chip. The layup of the RF-chip also enables the chip to be worn conspicuously by users.

With the foregoing and other objects in view, there is provided, in accordance with the invention, a method utilizing a tag with embedded RF-enabled chip having the steps of providing an apparel body of a cloth material, having at least one clothing layer enclosing a limb cavity and having an inner surface and an outer surface opposing the inner surface, providing a RF tag layup with a first tag layer of a polymeric adhesive material directly coupled to the apparel body and a second tag layer directly coupled to the first tag layer to encapsulate and define, in a watertight configuration, a chip cavity with an electronic chip disposed therein and having a non-transitory memory storage operably configured to store digital data thereon and a data transmitter operably configured to wirelessly transfer the stored digital data through an electronic communication protocol and using radio waves, and providing a data reader operably configured to receive the digital data stored on the non-transitory memory storage of the electronic chip. The process may also include storing digital data on the non-transitory memory storage of the electronic chip and utilizing the data reader to receive the digital data from the non-transitory memory storage of the electronic chip.

In accordance with a further feature of the present invention, the electronic chip is of a flexible material and includes a surface adhesively coupled to the first tag layer. Further, the electronic chip may utilize an NFC electronic communication protocol and may be passive.

In accordance with another feature, an embodiment of the present invention includes the apparel body having a neck aperture, two enclosed arm apertures, and an enclosed lower aperture defined thereon, wherein the first tag layer of the RF tag layup is directly coupled to at least one of the inner surface of the apparel body proximal to the neck aperture and the outer surface of the apparel body proximal to one of the two enclosed arm apertures.

In accordance with a further feature of the present invention, the first tag layer and the second tag layer are directly coupled together in a hermetically sealed configuration.

In accordance with yet another feature of the present invention, the first tag layer and the second tag layer are adhesively coupled together.

In accordance with an additional feature of the present invention, the electronic chip is of a flexible material and includes a surface adhesively coupled to the first tag layer.

In accordance with another feature, an embodiment of the present invention also includes providing the electronic chip having the digital data stored thereon, the digital data representing apparel source-identifying information specific and unique to the apparel body and utilizing the data reader to receive the digital data and electronically access, using a web domain address, a web domain over a network to display source-identifying information specific and unique to the apparel body.

In accordance with yet another feature, an embodiment of the present invention also includes providing the electronic chip having the digital data stored thereon, the digital data representing a digital door access code and providing an electronic door lock utilized by a door operably configured to open, close and lock, wherein the electronic door lock communicatively coupled to an electronic controller having the data reader communicatively coupled thereto. Additionally, the data reader is utilized to receive the digital data and authenticate the digital door access code and then initiate the electronic door lock with the electronic controller upon authentication of the digital door access code received from the digital data stored on the electronic chip.

In accordance with an additional feature of the present invention, a RF tag layup is stitched around a perimeter of the RF tag layup to the apparel body and the first tag layer is of a liquid impervious polymeric material.

In accordance with another embodiment of the present invention, a piece of apparel is disclosed with an embedded RF-enabled chip thereon and has an apparel body of a cloth material, having at least one clothing layer enclosing a limb cavity and having an inner surface and an outer surface opposing the inner surface and having an a RF tag layup with a first tag layer of a polymeric adhesive material directly coupled to the apparel body and a second tag layer directly coupled to the first tag layer to encapsulate and define, in a watertight configuration, a chip cavity with an electronic chip disposed therein and having a non-transitory memory storage operably configured to store digital data thereon and a data transmitter operably configured to wirelessly transfer the stored digital data through an electronic communication protocol and using radio waves to a data reader.

Although the invention is illustrated and described herein as embodied in a utilization method and tag with embedded RF-enabled chip therein, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time. Also, for purposes of description herein, the terms "upper", "lower", "left," "rear," "right," "front," "vertical," "horizontal," and derivatives thereof relate to the invention as oriented in the figures and is not to be construed as limiting any feature to be a particular orientation, as said orientation may be changed based on the user's perspective of the device. Furthermore, there is no intention to be bound by any expressed or implied theory presented in the preceding technical field, background, brief summary or the following detailed description.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of the tag layup, spanning from side-to-side. The terms "program," "software application," and the like as used herein, are defined as a sequence of instructions designed for execution on a computer system. A "program," "computer program," or "software application" may include a subroutine, a function, a procedure, an object method, an object implementation, an executable application, an applet, a servlet, a source code, an object code, a shared library/dynamic load library and/or other sequence of instructions designed for execution on a computer system.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

FIG. 1 is an elevational front view of a piece of apparel with a tag having embedded RF-enabled chip therein in accordance with one embodiment of the present invention;

FIG. 2 is a close-up view of the tag having the RF-enabled chip embedded therein in FIG. 1;

DETAILED DESCRIPTION

Figure 3:
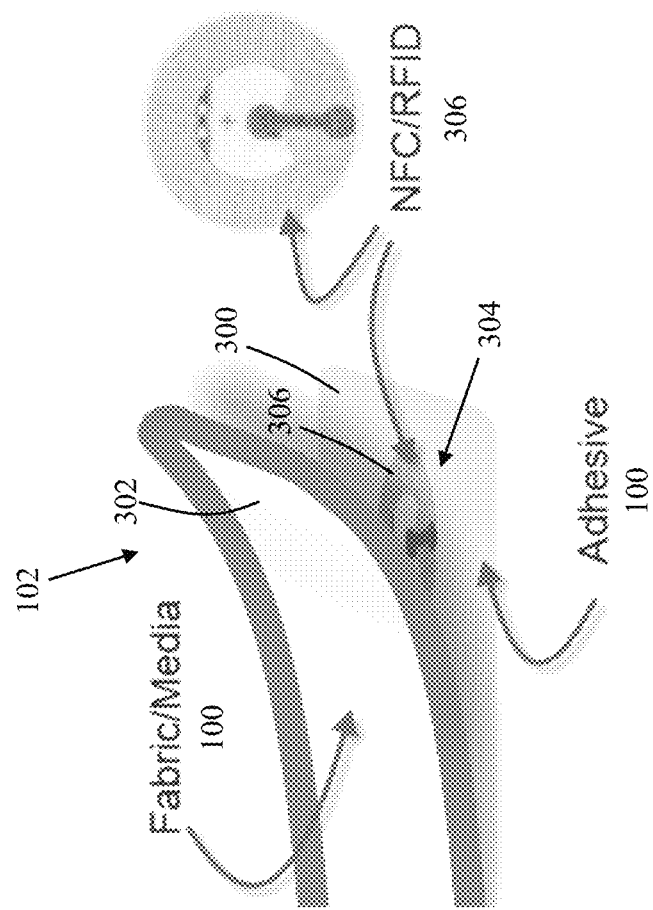
FIG. 3 is a perspective and fragmentary view of a tag layup in accordance with one embodiment of the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

With reference to FIG. 1, the present invention provides a novel and efficient method utilizing a tag with embedded RF-enabled chip 100 thereon for authenticating goods, namely apparel items, directing consumers to website domains displaying information regarding the apparel items, providing security for entry and egress into a building structure, providing information regarding the user wearing the apparel item (e.g., contact information for the user), tracking and logging employee time in a working environment, identifying individuals wearing the apparel item, tracking garments in the laundry industry, and locking and unlocking doors (to name a few applications of the present invention).

Referring now to FIGS. 1-3, one embodiment of the present invention is shown. FIGS. 1-3 show several advantageous features of the present invention, but, as will be described below, the invention can be provided in several shapes, sizes, combinations of features and components, and varying numbers and functions of the components. The first example of a method utilizing a tag with embedded RF-enabled chip 100, as shown in FIGS. 1-3, includes a step of providing an apparel body 100 of a cloth material, having at least one clothing layer 200 enclosing a limb cavity 110 and having an inner surface 112 and an outer surface 114 opposing the inner surface 112. While various types of apparel items may be utilized, the present invention has been found particularly advantageous for shirts wearable by users. For example, a tag 102 with an embedded RF-enabled chip 306 is configured for a less conspicuous placement on the shirt, thereby reducing the possibility of detection by users and onlookers.

The placement of the tag 102 with an embedded RF-enabled chip 306 may be more conspicuous, depending on a variety of factors including, without limitation, the user's preference or purpose in displaying, concealing, or wearing the tag 102. Likewise, in alternate embodiments of the present invention, the tag 102 with an embedded RF-enabled chip 306 may be utilized in conjunction with, or on, the apparel body 100 or the body 100 of a variety of non-apparel tangible items including, without limitation, mugs, bottles, boxes, hats, or any number of widely available retail products, having the inner surface 112 and the outer surface 114. In some embodiments, the function or purpose of the utilization method and tag 102 with an embedded RF-enabled chip 306 may be to verify the authenticity of the apparel body 100 or of a non-apparel equivalent, i.e., the body 100, that the tag 102 is adhered or affixed to.

The tag 102, which may also be referred to herein as an RF tag layup 102, is provided (as shown in step 502 in FIG. 5) and beneficially includes a first tag layer 300 of a polymeric adhesive material (e.g., epoxy, polyurethane, cyanoacrylate and acrylic polymers) directly coupled to the apparel body 100 and a second tag layer 302 directly coupled to the first tag layer 300 to encapsulate and define, in a watertight configuration, a chip cavity 304. The tag layers 300, 302 may also be referred to as walls, which broadly encompass continuous structures, as well as separate structures that are coupled together so as to form a substantially continuous external surface. The electronic chip 306 is disposed within the chip cavity 304, preferably in a configuration whereby movement of the electronic chip 306 is prevented from moving (e.g., by compressive forces caused by the first and second tag layers 300, 302 on the electronic chip 306). In one embodiment, the first and second tag layers 300, 302 and resulting chip cavity 304 are preferably 0.25-2 inches in length and height. In one embodiment, the first tag layer 300 may be selectively removable from the apparel body 100 with approximately 0.5-2 lbf, while in other embodiments, the first tag layer 300 may permanently adhered to the apparel body 100, thereby causing damage to the apparel body and/or tag layer 300 if removal is attempted. Referring to FIG. 2, the RF tag layup 102 may include two opposing sides 202, 204 and upper and lower ends 206, 208 that may define the length and height, respectively. As best seen in FIG. 3, the second tag layer 302 includes an outer surface exposed to an ambient environment (i.e., without another layer of material attached thereto) and includes an inner surface, opposing the outer surface of the second tag layer 302 that is attached to the first tag layer 300.

Figure 4:
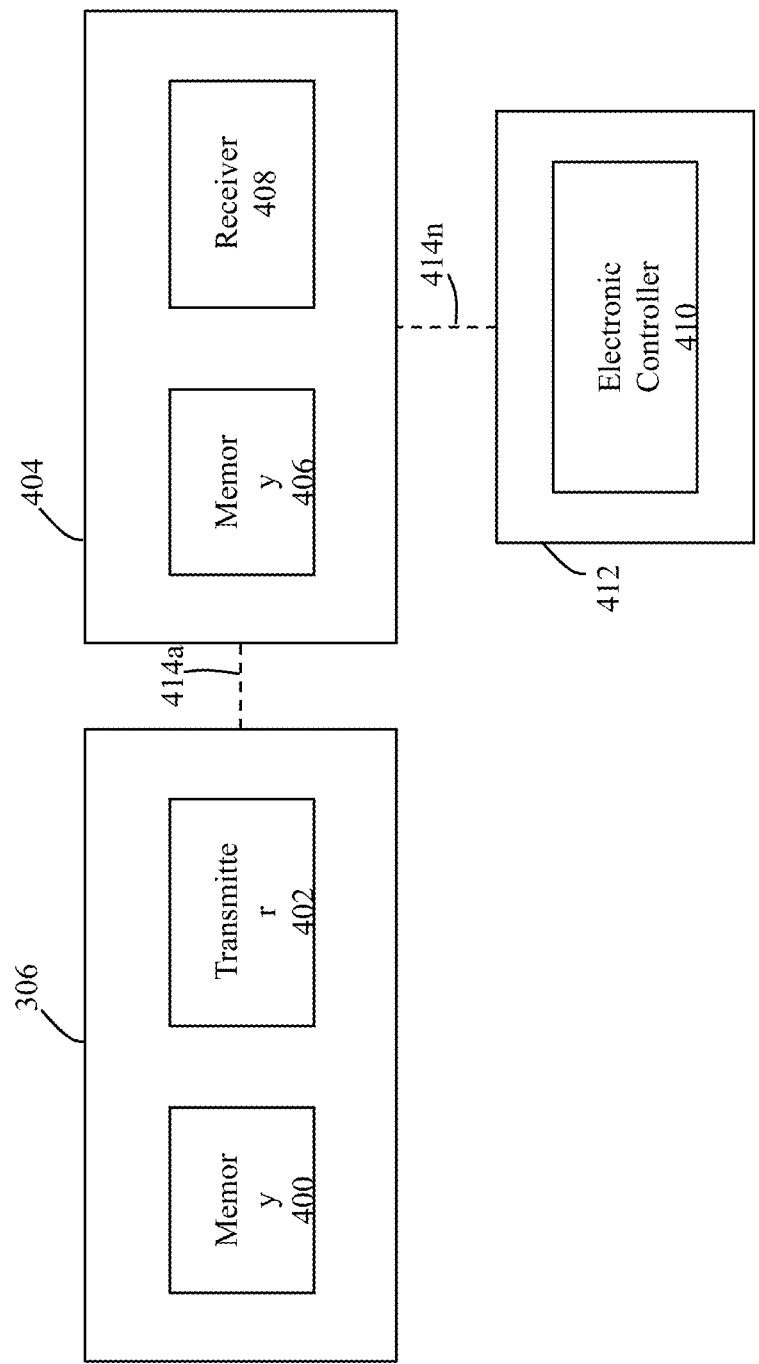
FIG. 4 is a schematic diagram of the electronic components utilized in the method utilizing the tag with embedded RF-enabled chip thereon in accordance with one embodiment of the present invention.

With reference to FIGS. 3-4, the electronic chip 306 includes a non-transitory memory storage 400 operably configured to store digital data thereon and a data transmitter 402 operably configured to wirelessly transfer the stored digital data through an electronic communication protocol and using radio waves. In one embodiment, the electronic chip 306 may be an RFID chip. The electronic chip 306 may use electromagnetic fields to automatically identify and track tags attached to objects. An RFID tag may include a small radio transponder, a radio receiver, and a transmitter. When triggered by an electromagnetic interrogation pulse from a nearby RFID reader device 404, the tag or chip 306 transmits digital data, usually an identifying inventory number, back to the reader 404. This number can be used to conduct, track, or maintain a continually organized and accurate inventory of apparel items, which is particularly beneficial for laundry mats housing and cleaning a plurality of apparel items owned by a plurality of users. RFID chips are generally available in two types, passive tags, that are powered by energy from the RFID reader's interrogating radio waves, and active tags, that are powered by a battery and thus can be read at a greater range from the RFID reader. The present invention is advantageously configured to work with passive electronic chips, thereby reducing weight of the electronic chip 306 and reducing the likelihood of failure. The electronic chip 306 may also utilize standards of ISO/IEC 18000 and ISO/IEC 29167, which use on-chip cryptography methods for untraceability, tag and reader authentication, and over-the-air privacy. ISO/IEC 20248 specifies a digital signature data structure for RFID and barcodes providing data, source and read method authenticity. This work is done within ISO/IEC JTC 1/SC 31 automatic identification and data capture techniques.

In preferred embodiments, the electronic chip 306 is a sticker that is of a flexible material (e.g., permitting repeated bending without failure) and includes a surface adhesively coupled to the first tag layer 300. The electronic chip 302 may also utilize an NFC electronic communication protocol and is passive. The NCF chip 306 may have a connection speed of approximately less than 1 ms and has a read range of less than approximately 50 ft, but typically ranges from 0-4 inches. The NFC chip 306 may include a set of communication protocols for communication between two electronic devices, e.g., the chip 306 and reader 404, over a distance of 4 cm (1½ in) or less. The NFC chip 306 thereby provides a lower-speed connection with simple setup that can be used to bootstrap more-capable wireless connections.

The data reader 404 provided in the present invention (as shown in step 504 in FIG. 5) may be operably configured to receive the digital data stored on the non-transitory memory storage 400 of the electronic chip 306. In one embodiment, the digital data stored on the non-transitory memory storage 400 may be uploaded or placed on the non-transitory memory storage 400 before placement in the tag layup 102, while other embodiments enable the user to upload data to the non-transitory memory storage 400 after the electronic chip 306 is placed in the layup 102. The data reader 404 may be a fixed infrastructure reader, but is preferably a handheld reader, e.g., a user's mobile electronic computing device. Next, as shown in step 506 in FIG. 5, digital data is stored on the non-transitory memory storage 400 of the electronic chip 306. Next, as shown in step 508 in FIG. 5, the data reader 404 is utilized to receive the digital data from the non-transitory memory storage 400 of the electronic chip 306 and may be separately stored on a nontransitory memory 406 resident on the data reader 404, e.g., a user's mobile computing device. The process may start and terminate in steps 500, 510, respectively.

In one exemplary embodiment and application of the present invention, step 508 may include providing the electronic chip 306 having the digital data stored thereon, wherein the digital data represents a digital door access code. An electronic door lock is provided that is utilized by a door operably configured to open, close and lock. The electronic door lock 412 is communicatively coupled to an electronic controller 410 having the data reader 404 communicatively coupled thereto. The data reader 404 is utilized to receive the digital data and authenticate the digital door access code, whereby the electronic door lock 412 is initiated with the electronic controller 410 upon authentication of the digital door access code received from the digital data stored on the electronic chip 306. FIG. 4 depicts various wireless communication links 414a-n (wherein "n" represents any number greater than one) utilized with implementing at least one embodiment of the present invention.

The near field communication (NFC) interface on the electronic chip 306 may allow for extremely close-range communication at relatively low data rates (e.g., 424 kb/s). The NFC interface may take place via magnetic field induction, allowing the NFC interface to communicate with other NFC interfaces located on computing devices or to retrieve information from tags having radio frequency identification (RFID) circuitry. The NFC interface may enable initiation and/or facilitation of data transfer from and to the computing devices with an extremely close range (e.g., 4 centimeters).

The memory associated with devices utilized in the present invention may be, for example, one or more buffer, a flash memory, or non-volatile memory, such as random-access memory (RAM). The computing devices may also include non-volatile storage. The non-volatile storage may represent any suitable storage medium, such as a hard disk drive or non-volatile memory, such as flash memory.

The processing device, e.g., utilized on the controller 410, can be, for example, a central processing unit (CPU), a microcontroller, or a microprocessing device, including a "general purpose" microprocessing device or a special purpose microprocessing device. The processing device executes code stored in memory to carry out operation/instructions of the computing devices. The processing device may provide the processing capability to execute an operating system, run various applications, and provide processing for one or more of the techniques described herein.

In one embodiment, the apparel body 100 may include a neck aperture 116, two enclosed arm apertures 104, 106, and an enclosed lower aperture 108 defined thereon. The first tag layer 300 of the RF tag layup 102 is directly coupled to at least one of the inner surface 112 of the apparel body 100 proximal to the neck aperture 116 and the outer surface 114 of the apparel body 100 proximal to one of the two enclosed arm apertures 104, 106. In other embodiments, the RF tag layup 102 may be utilized on pants or hats.

A cloth material may be formed from a variety of different clothing material, ranging from cotton, grasses, and furs, to much more elaborate and exotic materials. Cloth material may be a composite of materials and may be woven or knitted, and can be made from a large variety of fibers, which in turn can be natural, cellulose, or synthetic.

Referring back to FIG. 3, the first tag layer 300 and the second tag layer 302 are directly coupled together in a hermetically sealed configuration, whereby liquid and gas are inhibited or prevented from entering the chip cavity 304. Preferably, the material for the second tag layer 302 sufficiently permits transportation of RF waves, e.g., PVC or polyurethane. Additionally, the material for the second tag layer 302 also preferably enables placement and attachment of indicia thereon, e.g., company labels. The first tag layer 300 and the second tag layer 302 are preferably adhesively coupled together with adhesive formed by the first tag layer 300, whereby the electronic chip 306 is of a flexible material and includes a surface adhesively coupled to the first tag layer 300.

In one embodiment, the electronic chip 306 has digital data stored thereon, wherein the digital data represents apparel source-identifying information specific and unique to the apparel body 100, e.g., the compositional ingredients of the apparel items, who manufactured the apparel item, where the apparel items was specifically manufactured, who tested the apparel item, the channels of trade of the specific apparel item, and whether or not the apparel items has been previously purchased, returned, etc. As such, the data reader 404 may be utilized to receive the digital data and electronically access, using a web domain address, a web domain over a network (e.g., a cellular network) to display source-identifying information specific and unique to the apparel body 100 or, where the apparel body 100 is not apparel but another tangible item, e.g., mug, bottle, box, hat, etc., to display source-identifying information specific and unique to that tangible item. This enables a user to quickly, effectively, and efficiently ascertain source-identifying information of the apparel item (before acquisition and after acquisition, including repeated washing of the apparel item).

To enable structural stability of the tag 102, the RF tag layup 102 may be stitched around a perimeter of the RF tag layup 102 to the apparel body 100 (as best seen in FIG. 2). Additionally, the first tag layer 300 may also be of a liquid impervious polymeric material (as identified above), thereby safely securing the electronic chip 306 in the RF tag layup 102.

Figure 5:
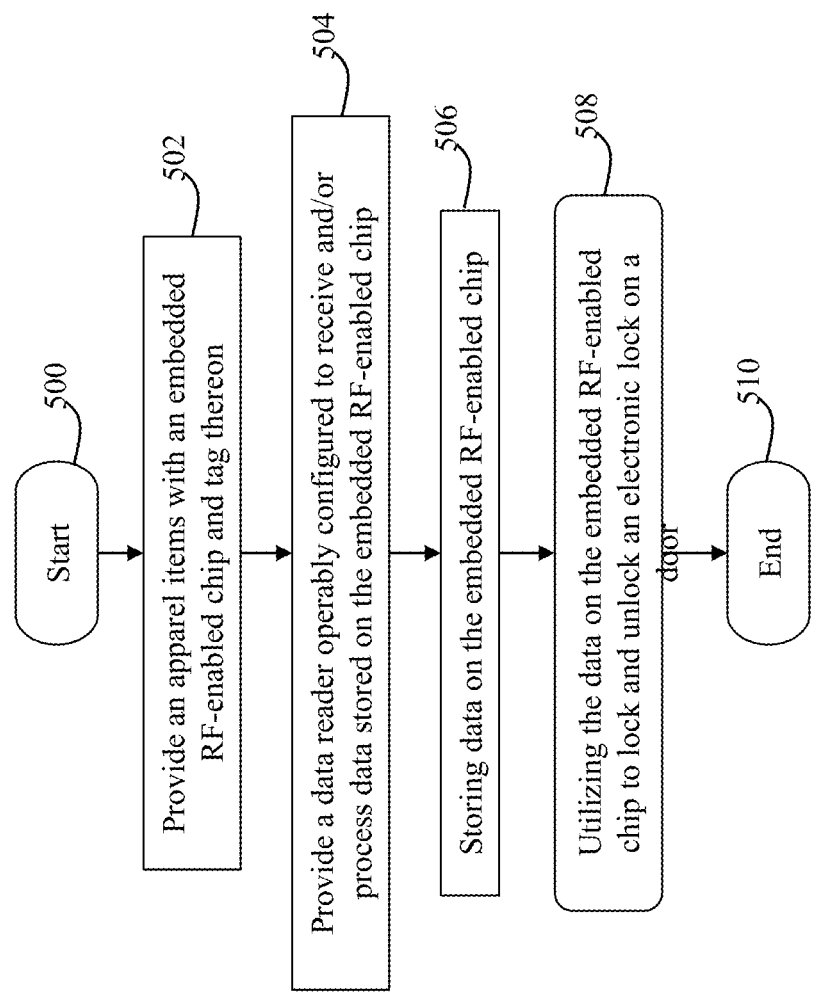
FIG. 5 is a process flow diagram depicting an exemplary method of utilizing the tag with embedded RF-enabled chip thereon.

Although FIG. 5 shows a specific order of executing the process steps, the order of executing the steps may be changed relative to the order shown in certain embodiments. Also, two or more blocks shown in succession may be executed concurrently or with partial concurrence in some embodiments. Certain steps may also be omitted in FIG. 5 for the sake of brevity. In some embodiments, some or all of the process steps included in FIG. 5 can be combined into a single process. Other steps are also contemplated based on the application of the RF tag layup 102 described herein.

Various modifications and additions can be made to the exemplary embodiments discussed without departing from the scope of the present disclosure. For example, while the embodiments described above refer to particular features, the scope of this disclosure also includes embodiments having different combinations of features and embodiments that do not include all of the above-described features.

What is claimed is:

1. A method utilizing a tag with embedded RF-enabled chip comprising the steps of:

providing an apparel body of a cloth material, having at least one clothing layer enclosing a limb cavity and having an inner surface and an outer surface opposing the inner surface;

providing a RF tag layup with a group consisting of a first tag layer and a second tag layer, wherein the first tag layer is made of a polymeric adhesive material directly coupled to the apparel body and the second tag layer with an outer surface exposed to an ambient environment and with an inner surface, opposing the outer surface of the second tag layer, directly coupled to the first tag layer to encapsulate and define, in a watertight configuration, a chip cavity with an electronic chip disposed on a flexible adhesive-backed sticker disposed in the chip cavity and compressed by the first and second tag layer preventing the electronic chip from moving and having a non-transitory memory storage operably configured to store digital data thereon representing a digital door access code, and a data transmitter operably configured to wirelessly transfer the stored digital data through an electronic communication protocol and using radio waves;

providing a data reader operably configured to receive the digital data stored on the non-transitory memory storage of the electronic chip;

providing an electronic door lock utilized by a door operably configured to open, close and lock, the electronic door lock communicatively coupled to an electronic controller having the data reader communicatively coupled thereto;

storing digital data on the non-transitory memory storage of the electronic chip;

utilizing the data reader to receive the digital data from the non-transitory memory storage of the electronic chip and authenticate the digital door access code; and initiating the electronic door lock with the electronic controller upon authentication of the digital door access code received from the digital data stored on the electronic chip.

2. The method according to claim 1, wherein:

the electronic chip utilizes an NFC electronic communication protocol and is passive.

3. The method according to claim 1, wherein the apparel body further comprises:

a neck aperture, two enclosed arm apertures, and an enclosed lower aperture defined thereon, wherein the first tag layer of the RF tag layup is directly coupled to at least one of the inner surface of the apparel body proximal to the neck aperture and the outer surface of the apparel body proximal to one of the two enclosed arm apertures.

4. The method according to claim 1, wherein:

the first tag layer and the second tag layer are directly coupled together in a hermetically sealed configuration.

5. The method according to claim 4, wherein:

the first tag layer and the second tag layer are adhesively coupled together.

6. The method according to claim 1, further comprising:

providing the electronic chip having the digital data stored thereon, the digital data representing apparel source-identifying information specific and unique to the apparel body; and utilizing the data reader to receive the digital data and electronically access, using a web domain address, a web domain over a network to display source-identifying information specific and unique to the apparel body.

7. The method according to claim 1, further comprising:

providing a RF tag layup stitched around a perimeter of the RF tag layup to the apparel body.

8. The method according to claim 1, wherein:

the first tag layer is of a liquid impervious polymeric material.

9. A method utilizing a tag with embedded RF-enabled chip comprising the steps of:

providing a body having an inner surface and an outer surface opposing the inner surface;

providing a RF tag layup with a group consisting of a first tag layer and a second tag layer, wherein the first tag layer is made of a polymeric adhesive material directly coupled to the inner surface of the body and the second tag layer with an outer surface not having another layer overlaid thereon and with an inner surface, opposing the outer surface of the second tag layer, directly coupled to the first tag layer to encapsulate and define, in a watertight and hermetically sealed configuration, a chip cavity with an electronic chip disposed on a flexible adhesive-backed sticker and disposed in the chip cavity and compressed by the first and second tag layer preventing the electronic chip from moving and having a non-transitory memory storage operably configured to store digital data thereon and a data transmitter operably configured to wirelessly transfer the stored digital data through an electronic communication protocol and using radio waves;

providing a data reader operably configured to receive the digital data stored on the non-transitory memory storage of the electronic chip;

storing digital data on the non-transitory memory storage of the electronic chip; and utilizing the data reader to receive the digital data from the non-transitory memory storage of the electronic chip.

10. A piece of apparel with an embedded RF-enabled chip thereon and comprising:

an apparel body of a cloth material, having at least one clothing layer enclosing a limb cavity and having an inner surface and an outer surface opposing the inner surface and having an RF tag layup with a group consisting of a first tag layer and a second tag layer, wherein the first tag layer is made of a polymeric adhesive material directly coupled to the inner surface of the apparel body and the second tag layer with an outer surface exposed to an ambient environment and with an inner surface, opposing the outer surface of the second tag layer, directly coupled to the first tag layer to encapsulate and define, in a watertight and hermetically sealed configuration, a chip cavity with an electronic chip disposed on a flexible adhesive-backed sticker disposed in the chip cavity and compressed by the first and second tag layer preventing the electronic chip from moving and having a non-transitory memory storage operably configured to store digital data thereon and a data transmitter operably configured to wirelessly transfer the stored digital data through an electronic communication protocol and using radio waves to a data reader.

11. The method according to claim 10, wherein:

the electronic chip is of a flexible material and includes a surface adhesively coupled to the first tag layer.

12. The method according to claim 10, wherein:

the electronic communication chip utilizes an NFC electronic communication protocol and is passive.

13. The method according to claim 10, wherein the apparel body further comprises:

a neck aperture, two enclosed arm apertures, and an enclosed lower aperture defined thereon, wherein the first tag layer of the RF tag layup is directly the apparel body proximal to the neck aperture.

14. The method according to claim 10, wherein:

the first tag layer and the second tag layer are adhesively coupled together.

15. The method according to claim 14, wherein:

the electronic chip is of a flexible material and includes a surface adhesively coupled to the first tag layer.

16. The method according to claim 10, further comprising:

providing a RF tag layup stitched around a perimeter of the RF tag layup to the apparel body.

* * * * *